United States Patent
Li et al.

(10) Patent No.: US 11,445,381 B2
(45) Date of Patent: Sep. 13, 2022

(54) METHODS SUPPORTING MULTICAST/MULTIUSER TRANSMISSION USING LISTEN AFTER TALK AND RELATED NETWORK NODES

(71) Applicant: TELEFONAKTIEBOLAGET LM ERICSSON (PUBL), Stockholm (SE)

(72) Inventors: Gen Li, Beijing (CN); Junaid Ansari, Fürth (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 294 days.

(21) Appl. No.: 16/614,203

(22) PCT Filed: May 16, 2017

(86) PCT No.: PCT/CN2017/084520
§ 371 (c)(1),
(2) Date: Nov. 15, 2019

(87) PCT Pub. No.: WO2018/209553
PCT Pub. Date: Nov. 22, 2018

(65) Prior Publication Data
US 2021/0360431 A1 Nov. 18, 2021

(51) Int. Cl.
*H04W 16/28* (2009.01)
*H04W 16/14* (2009.01)
(Continued)

(52) U.S. Cl.
CPC .......... *H04W 16/28* (2013.01); *H04L 1/1896* (2013.01); *H04W 16/14* (2013.01); *H04W 74/0816* (2013.01)

(58) Field of Classification Search
CPC ... H04W 28/04; H04W 72/04; H04W 72/042; H04W 88/08; H04W 16/14; H04W 16/28;
(Continued)

(56) References Cited

U.S. PATENT DOCUMENTS

2007/0097399 A1* 5/2007 Boyd ................... G06F 3/1284
358/1.13
2009/0305732 A1* 12/2009 Marcellino ............. H04L 51/24
455/466

(Continued)

FOREIGN PATENT DOCUMENTS

CN 101350946 A * 1/2009 .......... H04L 12/189
CN 102244838 A * 11/2011 .............. H04W 4/06
(Continued)

OTHER PUBLICATIONS

Luo et al., "Preliminary radio interface concepts for mm-wave mobile communications", Millimetre-Wave Based Mobile Radio Access Network for Fifth Generation Integrated Communications (mmMAGIC), Deliverable D4. 1, H2020-ICT-671650-mmMAGIC/D4.1, Jul. 7, 2016.

(Continued)

*Primary Examiner* — Peter G Solinsky
*Assistant Examiner* — Sanjay K Dewan
(74) *Attorney, Agent, or Firm* — Sage Patent Group

(57) ABSTRACT

A method to operate an access node of a wireless communication network is provided. A first frame may be provided including a first header and a first data block with first data for a first wireless terminal and a second wireless terminal. The header may include a first control field indicating a first idle period resource and a second control field indicating a second idle period resource, and the first and second idle period resources may be different. Transmission of the first frame to the first and second wireless terminals may be initiated. Responsive to receiving a notification message using the first idle period resource, a second frame may be provided including a second header and a second data block with second data for the second wireless terminal. Transmission of the second frame to the second wireless terminal (Continued)

may be initiated while deferring transmission to the first wireless terminal.

25 Claims, 10 Drawing Sheets

(51) Int. Cl.
  *H04W 74/08* (2009.01)
  *H04L 1/18* (2006.01)
(58) Field of Classification Search
  CPC . H04W 74/0816; H04L 5/0007; H04L 1/1896
  See application file for complete search history.

(56) References Cited

U.S. PATENT DOCUMENTS

| | | | |
|---|---|---|---|
| 2016/0249185 A1* | 8/2016 | Kondabattini | H04L 12/1886 |
| 2017/0079010 A1* | 3/2017 | Zhang | H04W 74/0816 |
| 2017/0085514 A1* | 3/2017 | Burrus | H04L 51/14 |
| 2017/0331577 A1* | 11/2017 | Parkvall | H04W 4/00 |
| 2017/0331670 A1* | 11/2017 | Parkvall | H04J 11/0079 |
| 2018/0152851 A1 | 5/2018 | Li et al. | |
| 2018/0376505 A1* | 12/2018 | Zhang | H04W 74/0816 |
| 2019/0246431 A1* | 8/2019 | Baghel | H04W 74/0816 |
| 2020/0162938 A1* | 5/2020 | Ansari | H04W 16/28 |
| 2020/0260486 A1* | 8/2020 | Zhou | H04W 28/0278 |

FOREIGN PATENT DOCUMENTS

| | | | | | |
|---|---|---|---|---|---|
| CN | 104427617 | A | * | 3/2015 | ........ H04W 72/0446 |
| CN | 104427617 | A1 | | 3/2015 | |
| CN | 105659692 | A | * | 6/2016 | ........... H04L 1/0026 |
| CN | 105659692 | A1 | | 6/2016 | |
| JP | 20111030502 | A | * | 2/2011 | ........... G01N 33/483 |
| JP | 2011130502 | A | | 6/2011 | |
| JP | 2015043559 | A | * | 3/2015 | ............. H04L 12/46 |
| JP | 2015512201 | A | | 4/2015 | |
| JP | WO 2016/080335 | A | * | 5/2016 | ........... H04W 74/08 |
| WO | WO 2013/119376 | A | * | 8/2013 | ........... H04B 1/7097 |
| WO | 2016080335 | A1 | | 5/2016 | |
| WO | 2016122254 | A1 | | 8/2016 | |
| WO | 2016197315 | A1 | | 12/2016 | |

OTHER PUBLICATIONS

MmMAGIC, "Initial concepts on 5G architecture and integration." Document No. H2020-ICT-671650-mmMAGIC /D.3.1, mmMAGIC, Mar. 31, 2016, Deliverable D3.1.

MmMAGIC, "Preliminary radio interface concepts for mm-wave mobile communications." Document No. H2020-ICT-671650-mmMAGIC/D4.1, mmMAGIC, Jun. 30, 2016, Deliverable D4.1.

* cited by examiner

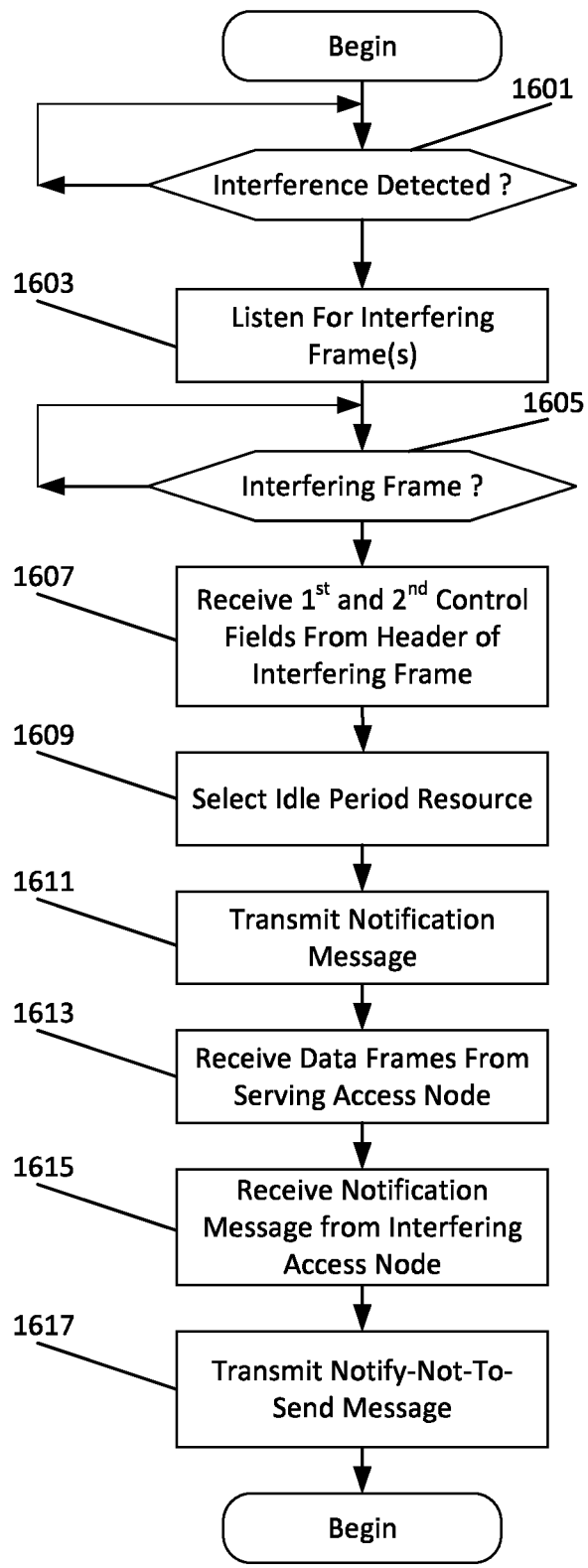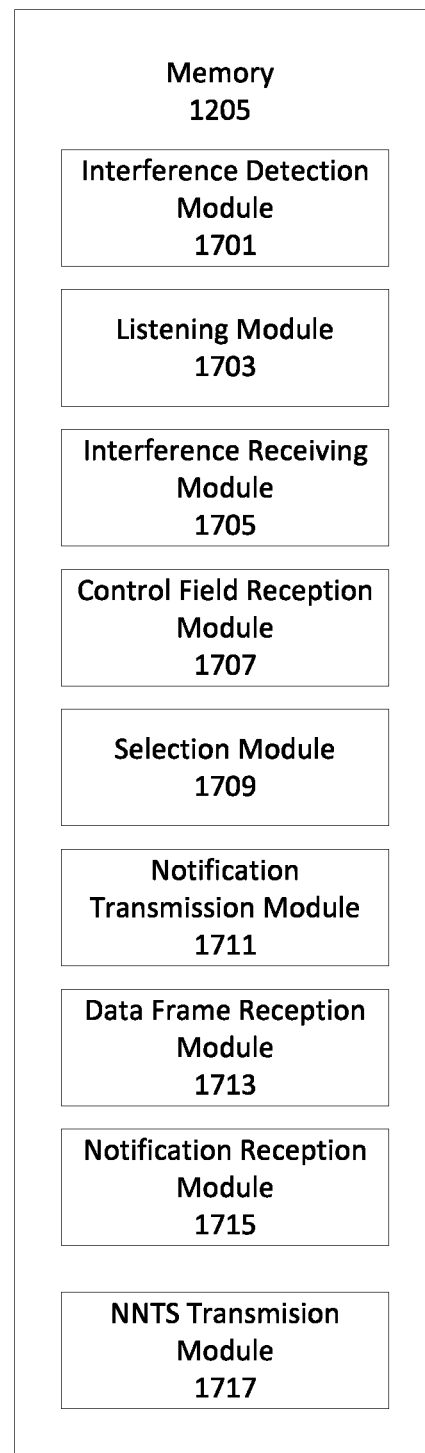

METHODS SUPPORTING MULTICAST/MULTIUSER TRANSMISSION USING LISTEN AFTER TALK AND RELATED NETWORK NODES

RELATED APPLICATIONS

This application is a national stage application of International Patent Application No. PCT/CN2017/084520, filed May 16, 2017, the disclosure of which is hereby incorporated herein by reference in its entirety.

TECHNICAL FIELD

The present disclosure relates to communications, and more particularly, to wireless communication methods and related access nodes and wireless terminals.

BACKGROUND

Mobile broadband will continue to drive demand for high overall traffic capacity and high achievable end-user data rates in wireless access networks. Several scenarios in the future may require data rates of up to 10 Gbps in local areas. These demands for very high system capacity and very high end-user date rates may be met by networks with distances between access nodes ranging from a few meters in indoor deployments up to roughly 50 meters in outdoor deployments, i.e. with an infra-structure density considerably higher than the densest networks of today. The wide transmission bandwidths needed to provide data rates up to 10 Gbps and above can likely only be obtained from new technologies. High-gain beamforming with large/massive numbers of antennas (typically realized with array antennas) can be used to increase the system throughput while mitigating interference. Such networks are referred to as NR (New Radio) systems in the following disclosure.

Besides traditional licensed exclusive bands, NR (New Radio) systems are also expected to operate on unlicensed bands, especially for enterprise solutions. Thus, coexistence support may be needed to enable spectrum sharing between different operators or other systems. Listen-Before-Talk (LBT) mechanisms may provide flexible ways to achieve such coexistence. A significant reason is that it is a distributed mechanism so that there may be no need to exchange information between different systems which may be more difficult. While LBT has been effective to provide spectral coexistence for wide beam width transmissions, numerous studies (for instance, as discussed below with respect to FIG. 3) have shown that LBT may not be reliable for highly directional transmissions.

Unlike classical omni-directional transmit and receive antenna radiation patterns, directional communication may have different hidden and exposed terminal problems. Moreover, narrow beam width directional transmissions may be more prone to a deafness problem compared to wider beam width transmissions. The hidden terminal problem refers to the case when the transmitter is unable to listen to the potential interferer resulting in packet collision (causing interference) at the receiver. The exposed terminal problem refers to the case when the potential transmitter overhears an ongoing transmission and refrains from its own transmission although its transmission would not have interfered with the ongoing transmission at the receiver. The deafness problem refers to the case when a receiver is unable to hear the (directional) transmission from a transmitter.

The Listen-After-Talk (LAT) scheme is introduced to address the above mentioned hidden- and exposed-node problems in a large/massive antennas case. A reason that such problems exist for LBT is the large difference between sensed power at the source node (SN) side and interference power at the destination node (DN) side in a high gain beamforming case. LBT relies on listening at the transmitter side to determine if there will be interference at the receiver side and thus a large difference between the two may result in significant problems. To reduce the interference problem, LAT considers involving the receiver to sense the channel directly. Another motivation for LAT is a low interference environment (i.e., a low number of collisions) for naïve direct transmissions. For this reason, LAT adopts a different logic compared to LBT, described as follows. The default mode for LAT is for a transmitter is 'to send' data, and unlike LBT, data transmission is not delayed until after confirming that a channel is not occupied by interfering transmissions. In LAT, the SN transmits when data packets arrive for transmission and then resolves collisions detected by the DN using coordination signaling.

Existing LAT schemes, however, may not adequately address issues relating to multicast and/or multiuser transmissions where data is sent to multiple wireless terminals.

SUMMARY

According to some embodiments of inventive concepts, a method may be provided to operate an access node of a wireless communication network. A first frame may be provided including a first header and a first data block with first data for first wireless terminal and second wireless terminal. The header may include a first control field indicating a first idle period resource and a second control field indicating a second idle period resource, and the first and second idle period resources may be different. Transmission of the first frame to the first and second wireless terminals may be initiated. Responsive to receiving a notification message using the first idle period resource, a second frame may be provided including a second header and a second data block with second data for the second wireless terminal, initiating transmission of the second frame to the second wireless terminal may be initiated while deferring transmission to the first wireless terminal.

According to some other embodiments of inventive concepts, an access node of a wireless communication network may be adapted to provide a first frame including a first header and a first data block with first data for first wireless terminal and second wireless terminal. The header may include a first control field indicating a first idle period resource and a second control field indicating a second idle period resource, and the first and second idle period resources may be different. The access node may be adapted to initiate transmission of the first frame to the first and second wireless terminals. Responsive to receiving a notification message using the first idle period resource, the access node may be adapted to provide a second frame including a second header and a second data block with second data for the second wireless terminal. The access node may be further adapted to initiate transmission of the second frame to the second wireless terminal while deferring transmission to the first wireless terminal.

According to still other embodiments of inventive concepts, an access node of a wireless communication network may include a first frame providing module, a first frame transmission module, a second frame providing module, and a second frame transmission module. The first frame providing module may provide a first frame including a first header and a first data block with first data for first wireless terminal and second wireless terminal. The header may include a first control field indicating a first idle period resource and a second control field indicating a second idle period resource, and the first and second idle period resources may be different. The first frame transmission module may initiate transmission of the first frame to the first and second wireless terminals. Responsive to receiving a notification message using the first idle period resource, the second frame providing module may provide a second frame including a second header and a second data block with second data for the second wireless terminal. The second frame transmission module may initiate transmission of the second frame to the second wireless terminal while deferring transmission to the first wireless terminal.

According to yet other embodiments of inventive concepts, an access node may include a transceiver and a processor coupled with the transceiver. The transceiver may be configured to provide wireless communications in a wireless communication network, and the processor may be configured to provide wireless communication through the transceiver. In addition, the processor may be configured to provide a first frame including a first header and a first data block with first data for first wireless terminal and second wireless terminal. The header may include a first control field indicating a first idle period resource and a second control field indicating a second idle period resource, and the first and second idle period resources may be different. The processor may be further configured to initiate transmission of the first frame to the first and second wireless terminals. The processor may also be configured to provide a second frame including a second header and a second data block with second data for the second wireless terminal responsive to receiving a notification message using the first idle period resource. In addition, the processor may be configured to initiate transmission of the second frame to the second wireless terminal while deferring transmission to the first wireless terminal.

According to further embodiments of inventive concepts, a method may be provided to operate a wireless terminal in a wireless communication network. Responsive to interference from an interfering access node, first and second control fields of a header of an interfering frame may be received. The first control field may indicate a first idle period resource, the second control field may indicate a second idle period resource, and the first and second idle period resources may be different. Based on the interference from the interfering access node, the first idle period resource may be selected. Responsive to selecting the first idle period resource, a notification message may be transmitted to the interfering access node using the first idle period resource, and after transmitting the notification message, a plurality of data frames from a serving access node may be received.

According to still further embodiments of inventive concepts, a wireless terminal in a wireless communication network may be adapted to receive first and second control fields of a header of an interfering frame responsive to interference from an interfering access node. The first control field may indicate a first idle period resource, the second control field may indicate a second idle period resource, and the first and second idle period resources may be different. Based on the interference from the interfering access node, the wireless terminal may select the first idle period resource. Responsive to selecting the first idle period resource, the wireless terminal may be adapted to transmit a notification message to the interfering access node using the first idle period resource. After transmitting the notification message, the wireless terminal may be adapted to receive a plurality of data frames from a serving access node.

According to more embodiments of inventive concepts, a wireless terminal in a wireless communication network may include an interference receiving module, a selection module, a notification transmission module, and a data frame reception module. Responsive to interference from an interfering access node, the interference receiving module may receive first and second control fields of a header of an interfering frame. The first control field may indicate a first idle period resource, the second control field may indicate a second idle period resource, and the first and second idle period resources may be different. Based on the interference from the interfering access node, the selection module may select the first idle period resource. Responsive to selecting the first idle period resource, the notification transmission module may transmit a notification message to the interfering access node using the first idle period resource. After transmitting the notification message, the data frame reception module may receive a plurality of data frames from a serving access node.

According to still more embodiments of inventive concepts, a wireless terminal may include a transceiver and a processor coupled with the transceiver. The transceiver may be configured to provide wireless communications in a wireless communication network. The processor may be configured to provide wireless communication through the transceiver. The processor may also be configured to receive first and second control fields of a header of an interfering frame responsive to interference from an interfering access node. The first control field may indicate a first idle period resource, the second control field may indicate a second idle period resource, and the first and second idle period resources may be different. The processor may be further configured to select the first idle period resource based on the interference from the interfering access node, and to transmit a notification message to the interfering access node using the first idle period resource responsive to selecting the first idle period resource. In addition, the processor may be configured to receive a plurality of data frames from a serving access node after transmitting the notification message.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 16 is a flow chart illustrating wireless terminal operations according to some embodiments of inventive concepts; and FIG. 17 is a block diagram illustrating wireless terminal memory with modules corresponding to operations of FIG. 16.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 12:
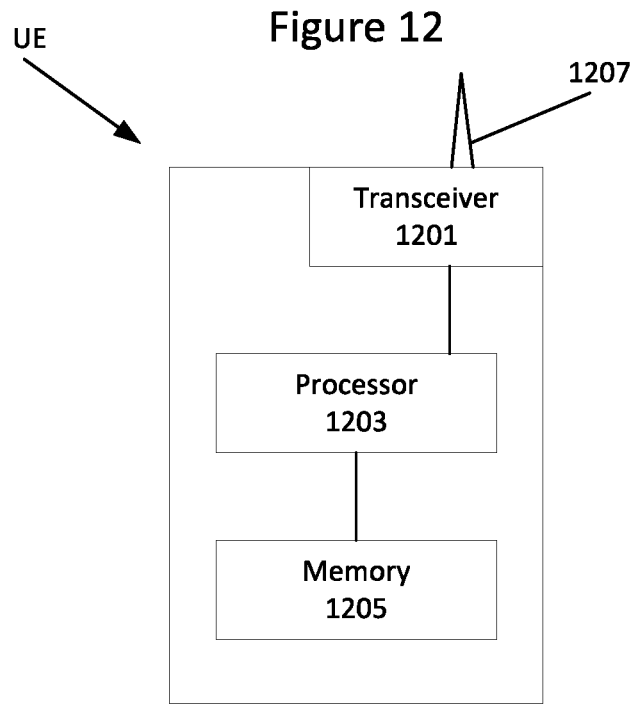
FIG. 12 is a block diagram of a wireless terminal UE according to some embodiments of inventive concepts.

FIG. 12 is a block diagram illustrating elements of a wireless terminal UE (also referred to as a wireless device, a wireless communication device, a wireless communication terminal, user equipment, a user equipment node/terminal/device, etc.) configured to provide wireless communication according to embodiments of inventive concepts. As shown, wireless terminal UE may include an antenna 1207, and a transceiver circuit 1201 (also referred to as a transceiver) including a transmitter and a receiver configured to provide uplink and downlink radio communications with a base station(s) of a radio access network. Wireless terminal UE may also include a processor circuit 1203 (also referred to as a processor) coupled to the transceiver circuit, and a memory circuit 1205 (also referred to as memory) coupled to the processor circuit. The memory circuit 1205 may include computer readable program code that when executed by the processor circuit 1203 causes the processor circuit to perform operations according to embodiments disclosed herein. According to other embodiments, processor circuit 1203 may be defined to include memory so that a separate memory circuit is not required. Wireless terminal UE may also include an interface (such as a user interface) coupled with processor 1203, and/or wireless terminal UE may be incorporated in a vehicle.

As discussed herein, operations of wireless terminal UE may be performed by processor 1203 and/or transceiver 1201. For example, processor 1203 may control transceiver 1201 to transmit communications through transceiver 1201 over a radio interface to a network base station (or to another UE) and/or to receive communications through transceiver 1201 from a network base station (or another UE) over a radio interface. Moreover, modules may be stored in memory 1205, and these modules may provide instructions so that when instructions of a module are executed by processor 1203, processor 1203 performs respective operations (e.g., operations discussed below with respect to Example Embodiments).

Figure 13:
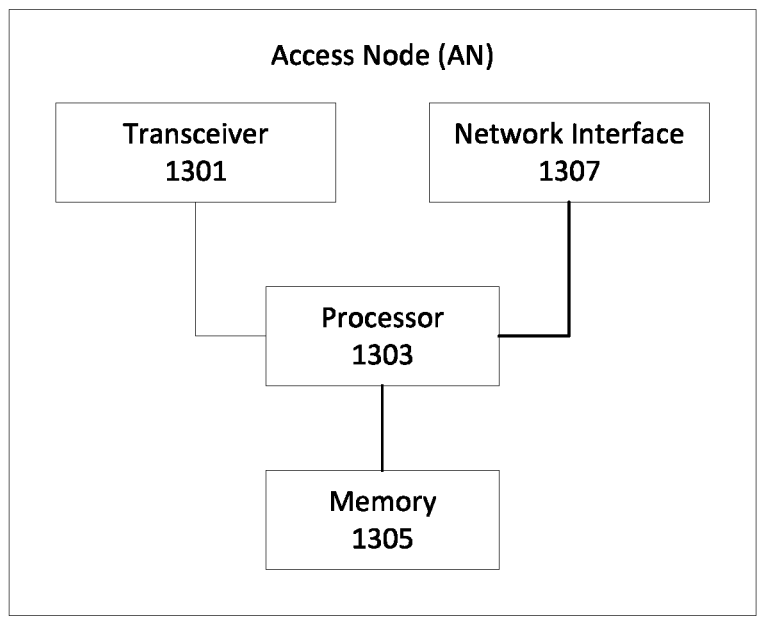
FIG. 13 is a block diagram of an access node (e.g., an eNB) according to some embodiments of inventive concepts.

FIG. 13 is a block diagram illustrating elements of an access node AN (also referred to as a network node, base station, eNB, eNodeB, etc.) of a Radio Access Network (RAN) configured to provide wireless/cellular communication according to embodiments of inventive concepts. As shown, the access node may include a transceiver circuit 1301 (also referred to as a transceiver) including a transmitter and a receiver configured to provide uplink and downlink radio communications with wireless terminals. The access node may include a network interface circuit 1307 (also referred to as a network interface) configured to provide communications with other nodes (e.g., with other base stations) of the RAN. The access node may also include a processor circuit 1303 (also referred to as a processor) coupled to the transceiver circuit, and a memory circuit 1305 (also referred to as memory) coupled to the processor circuit. The memory circuit 1305 may include computer readable program code that when executed by the processor circuit 1303 causes the processor circuit to perform operations according to embodiments disclosed herein. According to other embodiments, processor circuit 1303 may be defined to include memory so that a separate memory circuit is not required.

As discussed herein, operations of the access node may be performed by processor 1303, network interface 1307, and/or transceiver 1301. For example, processor 1303 may control transceiver 1301 to transmit communications through transceiver 1301 over a radio interface to one or more UEs and/or to receive communications through transceiver 1301 from one or more UEs over a radio interface. Similarly, processor 1303 may control network interface 1307 to transmit communications through network interface 1307 to one or more other network nodes and/or to receive communications through network interface from one or more other network nodes. Moreover, modules may be stored in memory 1305, and these modules may provide instructions so that when instructions of a module are executed by processor 1303, processor 1303 performs respective operations (e.g., operations discussed below with respect to Example Embodiments).

According to some other embodiments, the access node may be implemented as a control node without a transceiver. In such embodiments, transmission to a wireless terminal may be initiated by the access node so that transmission to the wireless terminal is provided through a network node including a transceiver, e.g., through a base station. According to embodiments where the access node is a base station including a transceiver, initiating transmission may include transmitting through the transceiver.

To provide a better understanding of LAT, the following definitions are introduced for idle time, notify-to-send message, and notify-not-to-send message.

Idle time is assumed after continuous data transmission. This is reasonable for shared spectrum (e.g., unlicensed band) since there are typically channel occupation limitation rules, e.g., the SN must stop transmitting and enter idle state after the contiguous transmission time exceeds a given threshold;

Notify-To-Send (NTS) message: This message can be transmitted by SN or DN, including the link information which will transmit data and expected occupation time duration;

Notify-Not-To-Send (NNTS) message: This message is transmitted from DN, telling its SN not to transmit data in indicated duration.

Figure 1:
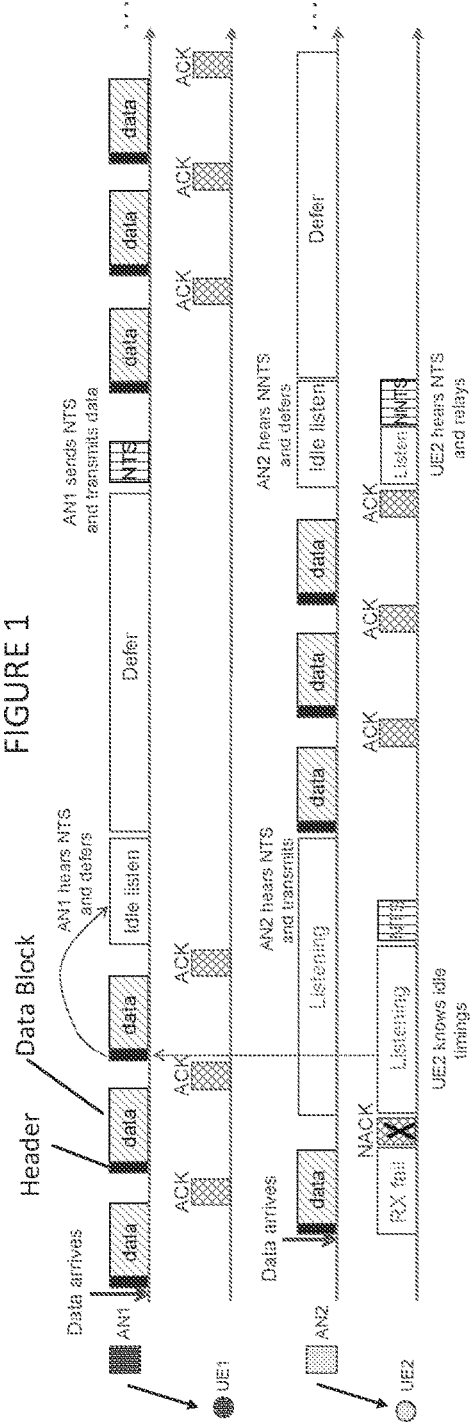
FIG. 1 is a signaling diagram illustrating an example of a listen after talk procedure where the link AN1→UE1 interferes with the link AN2→UE2.

FIG. 1 is a signaling diagram illustrating an example of a listen after talk procedure, where the link AN1→UE1 interferes with the link AN2→UE2. First, the listening function at the DN side (UE2) is triggered when it detects interference (from the AN1→UE1 link) and fails to receive the data from the SN (AN2). Then, the DN (UE2) of interfered link will coordinate the data transmission with SN (AN1) of the interfering link(s). Finally, the coordination will be performed in an idle time of the interfering link. In the non-limiting example in FIG. 1, the AN1→UE1 link interferes with the AN2→UE2 link. When UE2 fails to decode the data, it starts to look for the idle period of the interfering link and sends NTS (Notify To Send) message towards the AN2 direction. Since UE2 is interfered by AN1, AN1 can receive the message as well and then defer the transmission as NTS indicates. Besides, NTS may also indicate when AN2 will stop transmission and listen, i.e., idle period of AN2→UE2. Then, AN1 transmits NTS that can be received by UE2. Finally, NNTS (Notify Not To Send) is relayed by UE2 to let its transmitter AN2 know which resource is occupied by the interfering link and refrain from transmitting. By this scheme, the transmission of this interference pair (i.e. AN1-UE1 and AN2-UE2) is coordinated in a distributed way in order to carry out transmissions efficiently by taking turns.

Figure 2A:
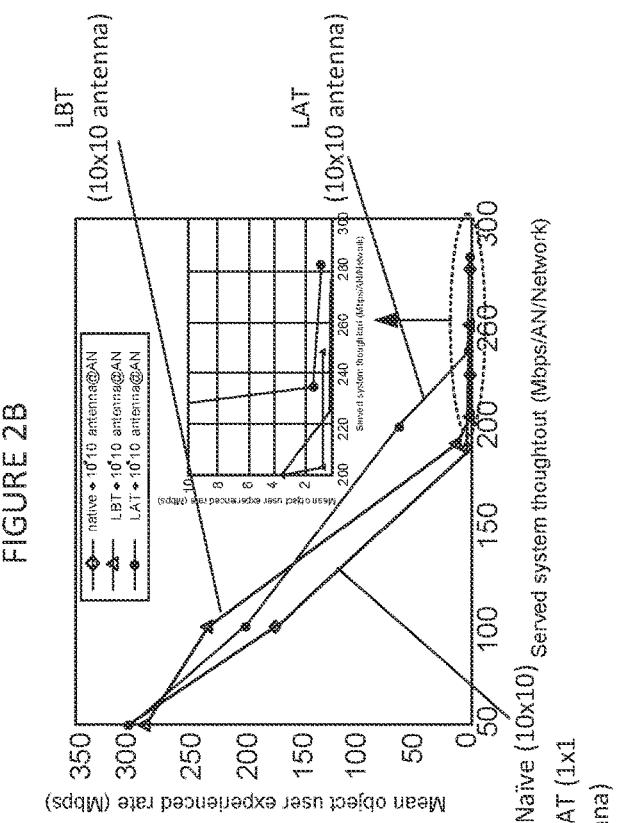
FIGS. 2A and 2B are graphs illustrating mean object and cell edge user experienced rate vs served system throughput.
Figure 2B:
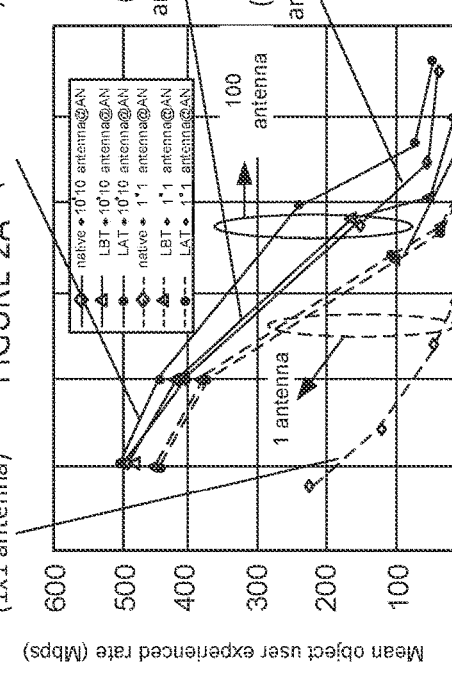

In order to compare different coexistence mechanisms, simulations have been conducted to study both mean object user experience rate and 5% cell edge user rate under different traffic settings. FIGS. 2A and 2B are graphs illustrating mean object and cell edge user experienced rate vs served system throughput. From dashed curves in FIGS. 2A and 2B, it can be observed that LBT may work better than naïve schemes (i.e., direct transmission without any coordination) and may provide performance similar to that of LAT in a 1 antenna case. This means that LBT may be preferred in current systems. However, in a 100 antenna array case as shown in solid lines of FIGS. 2A and 2B, LBT may provide performance that is similar to that of a naive scheme in a low traffic case and performance that is worse than a naïve scheme in a high traffic case. On the other hand, LAT may provide better performance than LBT in terms of mean and 5% cell edge experienced rate.

As discussed above, existing LAT schemes may assume that the data is sent to only one UE only at a given time, e.g., one data block is for AN1→UE1 or AN2→UE2 in one beamforming direction. This assumption may simplify the design of LAT schemes. However, it may limit the flexibility of data transmission and multiplexing gains. For example, when there are multiple different data blocks to different users or the same multicast data to different users, LAT designs may allow only sending data one by one sequentially to different UEs. Therefore, enabling multiuser data transmissions using LAT schemes may be desired.

According to some embodiments of inventive concepts, multi-user and/or beam transmission information may be included in the header of a data packet, and inactivation may be restricted to only the user/beam(s) which is/are interfering/interfered. In this case, the header format and idle period to send the coordination signaling may be changed.

According to some embodiments of inventive concepts, the header may include multiple control fields that are transmitted in different beamforming directions corresponding to the multiuser/multicast data transmission.

According to some other embodiments of inventive concepts, the resource in idle period may need to be divided into multiple parts for coordination signaling. The resource mapping rules may be indicated correspondingly in each header part. First, the other node (the UE subject to interference, also referred to as the victim node) detects which part(s) of the header is the interference source when it is interfered with and stops transmission in order to listen the channel according to the LAT scheme. Then, the victim node transmits notify-to-send (NTS) signaling in the corresponding idle period. Considering the non-limiting example in FIG. 3, if UE2 identifies interference at the dotted shaded part of the header, it is interfered by AN1→UE1 data. Then, UE2 will send NTS signaling to instruct AN1 to stop transmission to UE1 in the next period. Finally, AN1 will send the data to UE3 and UE5 instead of stopping all transmission as would be the case in traditional LAT scheme.

According to some embodiments disclosed herein, multiuser/multicast transmissions for listen after talk mechanisms may be enabled, and such embodiments may provide one or more of the following advantages:

Extending the use cases for listen after talk mechanisms by having more transmission flexibility;

Improving spectrum efficiency by employing multiuser/multicast transmission when using LAT. This may implicitly enable smaller delays (transmit signaling delays, queuing delays) at the transmitting nodes and may increase achievable data rates; and/or Efficient resource utilization through adaptive decisions at runtime to carry out transmissions to multiple users in orthogonal resources or in non-orthogonal resources. Spectrum costs may be important to run the network (e.g., according to an ER-NAP presentation, spectrum may be almost 50% of the total cost for operating a network in North America) and therefore high spectrum efficiency for high data rate transmissions may be beneficial.

Although terminology from 3GPP NR is used in the present disclosure to illustrate examples of embodiments of inventive concepts, this should not be considered as limiting with respect to the scope of inventive concepts to only the aforementioned system(s). Other wireless systems such as Wi-Fi may also benefit from exploiting inventive concepts covered within this disclosure.

While there may be reasons to use directional communication for cm-Wave and mm-Wave frequencies, inventive concepts described herein may be equally valid for other lower frequencies, where directional transmissions can be used. Inventive concepts may also apply to unlicensed spectrum, license shared spectrum and licensed spectrum.

Terminologies such as base station/eNodeB and UE should be considered non-limiting and such terminologies do not imply a certain hierarchical relation between the two. In general, an "eNodeB" could be considered as device 1 and a "UE" could be considered as device 2 and these two devices communicate with each other over some radio channel. The devices may also communicate directly with each other in the D2D (Device to Device) fashion and in network assisted D2D fashion.

According to some embodiments of inventive concepts, multi-user/beam transmission information may be included in the header of a data packet and inactivation may be limited to only the user/beam(s) which is interfering/interfered. In this case, the header format and idle period to send the coordination signaling may be changed.

As a first embodiment, the header may include multiple control fields that are transmitted in different beamforming directions corresponding to the multiuser/multicast data transmission.

Figure 3:
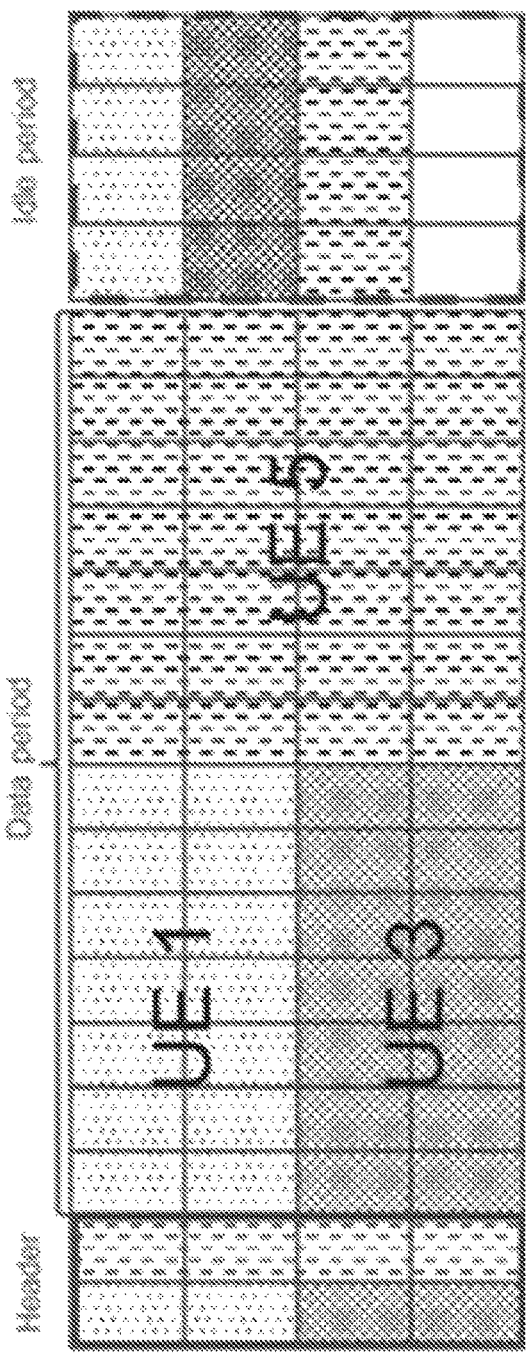
FIG. 3 is a diagram illustrating LAT-based multiuser transmission using orthogonal resources according to some embodiments of inventive concepts.

A non-limiting example of multiuser data transmission format is illustrated in FIG. 3 for LAT-based multiuser transmission using orthogonal resources. It is assumed that the transmissions for UE1, UE3 and UE5 are in different beamforming directions. Correspondingly, the header should be divided into 3 different parts with different beamforming directions.

As a second embodiment, the resource in the idle period may need to be divided into multiple parts for coordination signaling. The resource mapping rules should be correspondingly indicated in each header part. First, the victim node detects which part(s) of the header is the interference source when it is interfered with and stops transmission to listen to the channel according to the LAT scheme. Then, the victim node sends a notify-to-send (NTS) signal in a corresponding resource in the idle period. For example, if UE2 identifies interference at the dot shaded part of the header, it means that it is interfered by AN1→UE1 data. Then, it will send NTS signaling to instruct AN1 to stop transmission to UE1 in a next period. Finally, AN1 will send the data to UE3 and UE5 instead of altogether completely stopping transmission as in conventional LAT.

Figure 4:
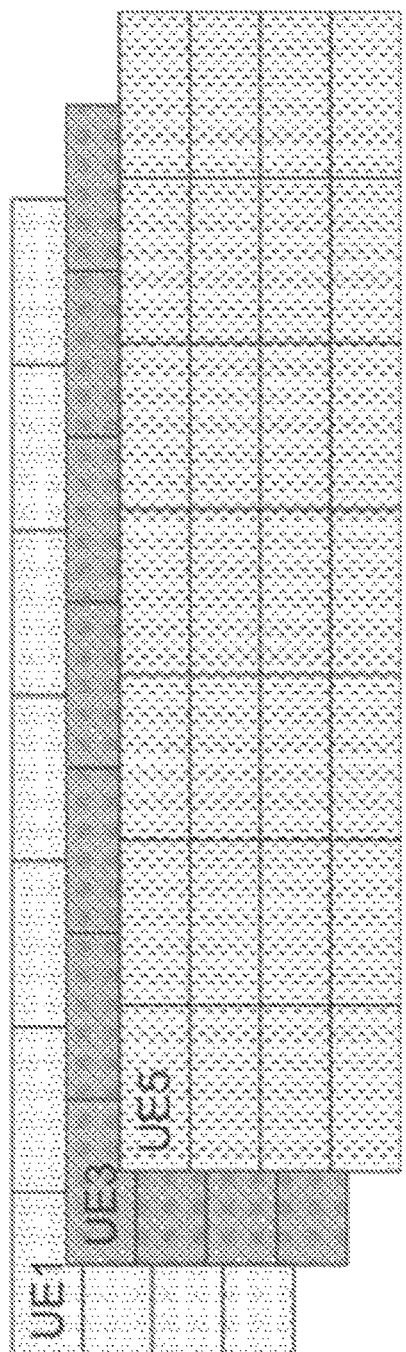
FIG. 4 is a diagram illustrating multiuser transmission in the same resource block according to some embodiments of inventive concepts.

The above described inventive concepts could also be applied to other multiuser transmission formats. The example in FIG. 3 illustrates orthogonal multiuser data transmission (i.e., transmission for multiple users in orthogonal (disjoint) resource blocks). The transmission for multiple users could also/alternatively be performed in the same resource block as shown in FIG. 4. Two cases are discussed by way of example as follows:

Spatial-reuse multiuser data transmission: Different data for each user and differentiation of multiple users is done in the spatial domain with different precoding matrices; and Multicast data transmission: The same data is transmitted to multiple users using the same resource.

Embodiments regarding when and how to proceed with multiuser and multicast data transmissions are described in sections below following the headers "Multiuser downlink data transmission" and "Multicast downlink data transmission," respectively. Embodiments regarding the feedback mechanism are described in the section below following the header "Feedback mechanism".

Figure 5:
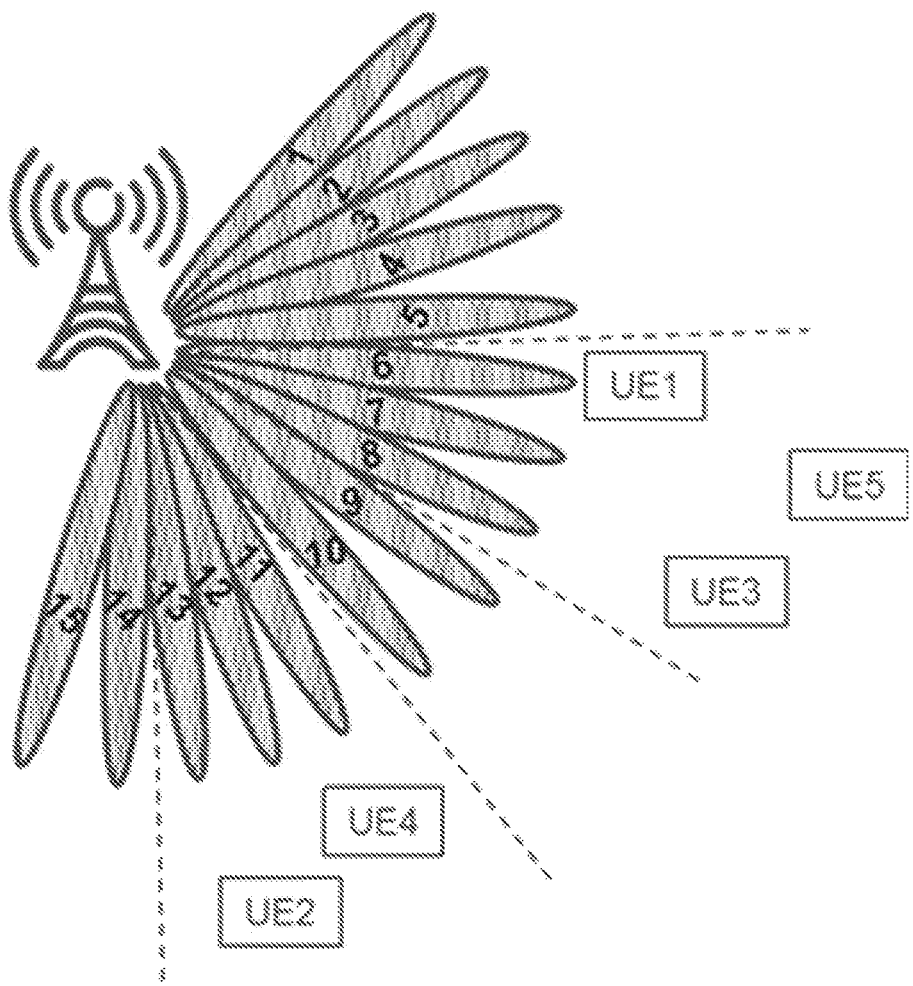
FIG. 5 is a schematic diagram illustrating an example of UE grouping to provide multiuser transmission according to some embodiments of inventive concepts.

When different data to multiple UEs is buffered for multiuser downlink transmission, an eNB (also referred to as a base station or access node) may decide how to transmit according to the following embodiments. As a first embodiment, transmission to multiple UEs may be limited to one beamwidth which is narrower than one threshold to favor an LAT scheme. A non-limiting example is illustrated in FIG. 5. In FIG. 5, UEs within adjacent beams are grouped together and the data to one UE group could be transmitted together as one data block. For example, UE1, UE3 and UE5 may be grouped together, and a transmission to the group including UE1, UE3, and UE5 may be performed using a transmission as discussed above with respect to FIG. 3 and/or FIG. 4. For example, beams 6-8 may define an adjacent beam group, with beam 6 used for communication with UE1, with beam 7 used for communication with UE5, and with beam 8 used for communication with UE 3.

The beamwidth threshold could be adapted based on the detected environment (cf. information related to topology, deployment setup, location of nodes, density of nodes, resource utilization, resource allocation, etc.) or interference status. For example, if it is detected that no or few nodes in the surrounding are operating on the same channel, the beamwidth threshold to have multiuser data transmission could be larger.

Figure 6:
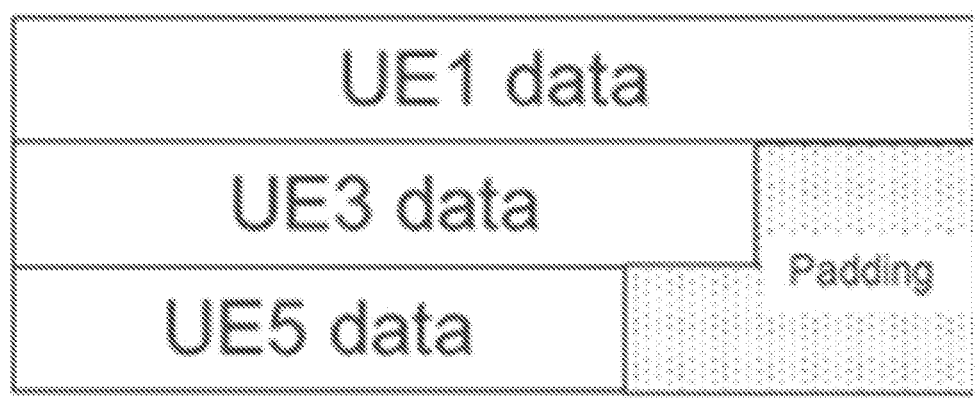
FIG. 6 is a diagram illustrating an example of data padding according to some embodiments of inventive concepts.

As another embodiment, the eNB could determine whether to use orthogonal or spatial reuse multiuser data transmission based on the channel status for these users and data buffering status. If the difference between the buffered data amounts for multiple users is large, it may be desirable to use orthogonal multiuser data transmission as discussed above with respect to FIG. 3. In this way, the eNB may allocate fewer resources to a UE(s) with less buffered data. It may be desirable to use spatial reuse transmission as discussed above with respect to FIG. 5 if the separation of the channels assigned to different UEs (e.g., UE1, UE3 and UE5) is enough to reduce/avoid inter-user interference. In this case, the MCS (Modulation Coding Scheme) level may be adjusted or small padding data (e.g. FIG. 6) may be added to make all users occupy the same resource as shown in FIG. 6. Note that if the spatial channel separation is not enough, it may also/still be desirable to use orthogonal multiuser data transmission.

When the same buffered data is to be transmitted to multiple UEs for a multicast downlink data transmission, the access node eNB (also referred to as a base station) may decide how to transmit according to the following embodiments.

Figure 7:
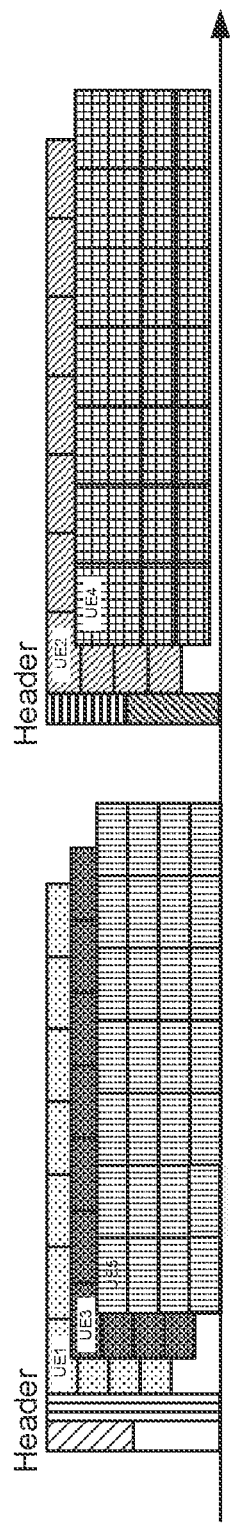
FIG. 7 is a diagram illustrating multicast transmissions with multiple groups of UEs according to some embodiments of inventive concepts.

As a first embodiment, the UEs may be divided in multiple groups in a similar manner as discussed above with respect to embodiments of FIG. 5 described in above. Then, the multicast data transmission may be carried out group by group. For example, as shown on the left side of FIG. 7, multicast data is transmitted to UE1, UE3, and UE5. Then, the data will be sent to a different UE group including UE2 and UE4 separately as illustrated on the right side of FIG. 7.

Figure 8:
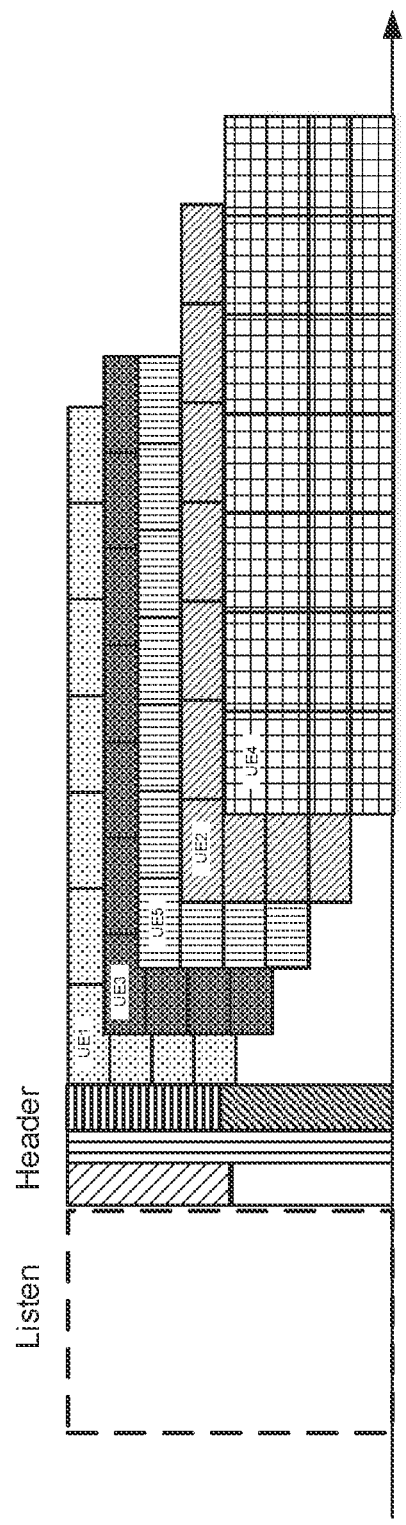
FIG. 8 is a diagram illustrating multicast transmission with LBT and LAT according to some embodiments of inventive concepts.

According to additional embodiments, the eNB could also perform both LBT and LAT to proceed with multicast data transmission. In particular, the eNB may listen to the channel and then transmits the multicast data to UEs in the same block as shown in FIG. 8.

Figure 9:
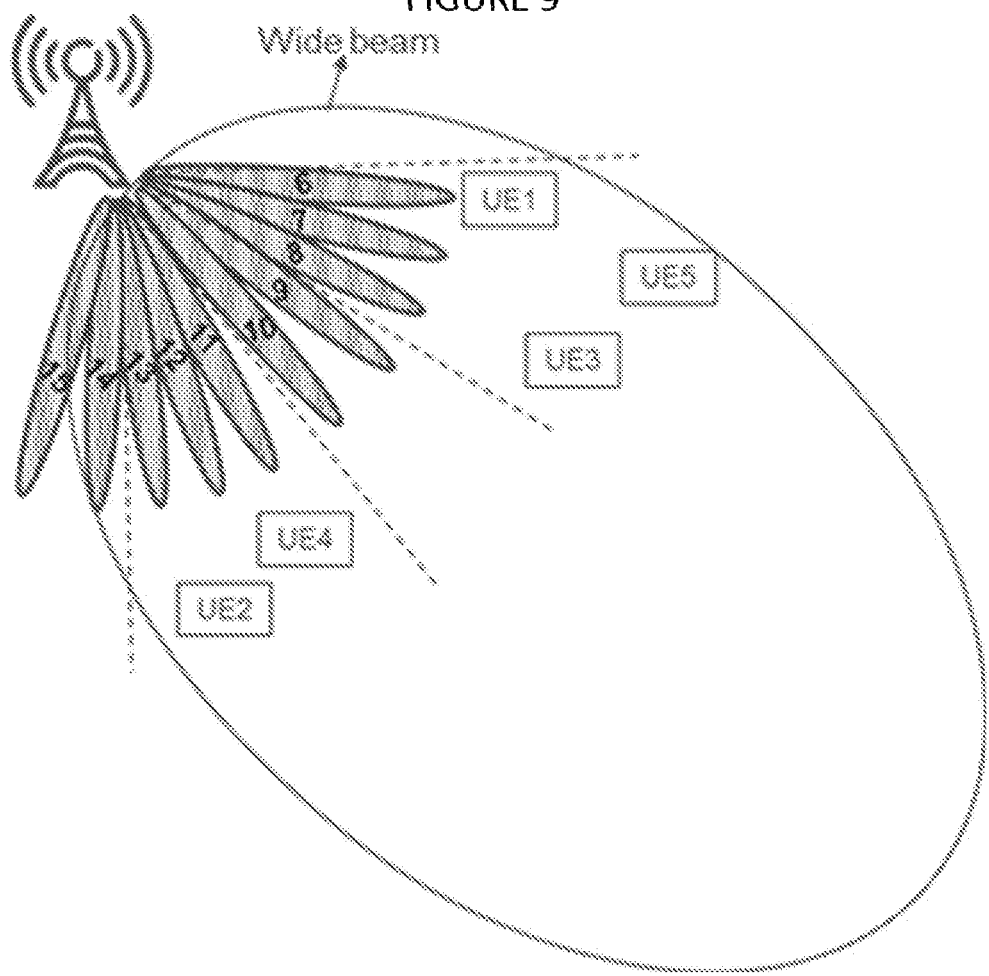
FIG. 9 illustrates an example of wide beam transmission to cover UEs involved in a data communication according to some embodiments of inventive concepts.

According to some embodiments, the transmission may use a smallest beamwidth required to transmit to the UEs involved in a communication. Of course, necessary margins for beamwidth could be introduced in practice to reduce/circumvent the deafness problem. A non-limiting example is illustrated in FIG. 9 where wide beam transmission is used to cover the UEs involved in a data communication.

Figure 10:
FIG. 10 is a signaling diagram Illustrating multiuser feedback according to some embodiments of inventive concepts.

As shown in FIG. 1, feedback may be useful in the LAT scheme after the data transmission. It may be inefficient and may introduce long delays if each UE provides independent ACK/NACK feedback. Thus, aggregated feedback from multiple users may be provided to decrease the delay as illustrated in FIG. 10.

Mapping rules for multiple users in time, frequency, code or spatial domain may be provided as discussed below. As a first embodiment, the mapping rules may be explicitly indicated in each header. For example, the resource to provide ACK/NACK feedback for multiple users could be scheduled in one specified grant, e.g., an ARQ (Automatic Repeat request) grant. As a second embodiment, the mapping rules may be implicitly indicated with existing UE-specific parameters. For example, CDMA could be used for differentiation of different UEs. There may be a limited number of sequences and each UE could calculate the sequence ID used for its feedback based on its allocated UE ID and a certain rule.

Figure 11:
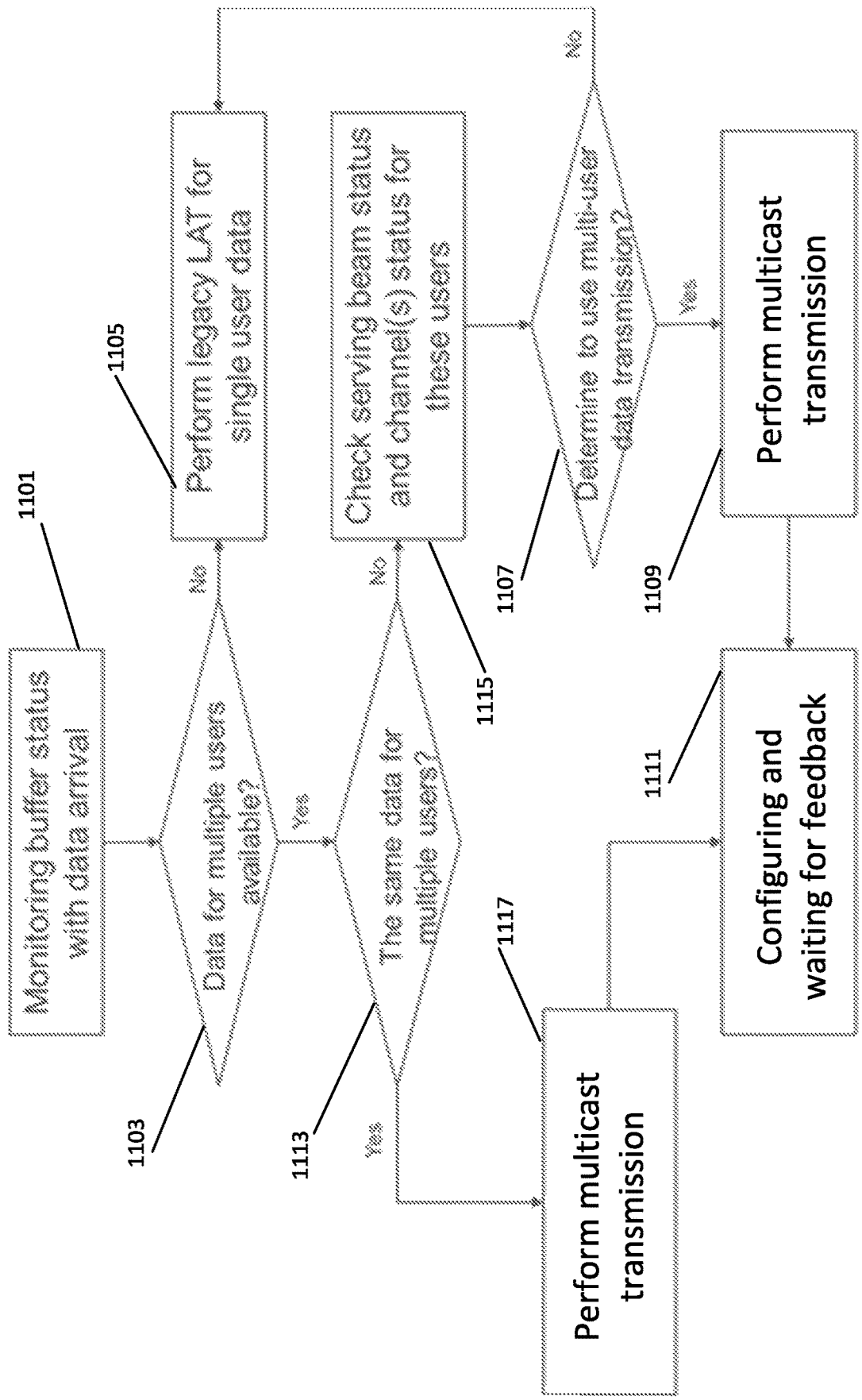
FIG. 11 is a flow chart illustrating access node operations to carry out multiuser transmission according to some embodiments of inventive concepts.

Operations at an access node (e.g., an eNB) to support multiuser/multicast transmission are illustrated in the flow chart of FIG. 11. At block 1101, access node processor 1303 may monitor a buffer status for arrival of downlink data (e.g., through network interface 1307) for transmission to wireless terminals UEs in a coverage area thereof. Responsive to buffered data being available for transmission to a single wireless terminal UE at block 1103, access node processor 1303 may perform Listen-After-Talk transmission (through transceiver 1301) at block 1105 as discussed above with respect to FIG. 1.

Responsive to buffered data being available for multiple wireless terminals UEs at block 1103 and the data being different for the multiple wireless terminals UEs at block 1113, access node processor 1303 may check serving beam status and channel(s) status for each of these wireless terminals UEs at block 1115. Responsive to determining that multi-user data transmission should not be performed (based on the serving beam status and channel(s) status for each wireless terminal UE) at block 1107, access node processor 1303 may separately perform Listen-After-Talk transmission (through transceiver 1301) for each wireless terminal UE at block 1105 as discussed above with respect to FIG. 1. Responsive to determining that multi-user data transmission should be performed (based on the serving beam status and channel(s) for each wireless terminal UE) at block 1107, access node processor 1303 may perform multiuser transmission (through transceiver 1301) using LAT at block 1109 as discussed above with respect to FIGS. 5 and/or 6 (i.e., in the section following the header "Multiuser Downlink Data Transmission").

Responsive to buffered data being available for multiple wireless terminals UEs at block 1103 and the data being the same for the multiple wireless terminals UEs at block 1113, access node processor 1303 may perform multicast downlink data transmission (through transceiver 1301) using LAT at block 1117 as discussed above with respect to FIGS. 7, 8, and/or 9 (i.e., in the section following the header "Multicast downlink data transmission."

Following block 1109 or 1117, access node processor 1303 may configure for a next transmission and/or wait for feedback at block 1111.

According to some embodiments of inventive concepts, methods may thus be provided to enable multiuser/multicast transmission based on the listen after talk (LAT) mechanism. According to some embodiments, multi-user/beam transmission information may be included in the frame header so that inactivation of only the user/beam(s) which are interfering/interfered can be carried out. This may allow multiuser/multicast transmissions with high spectral efficiency. The header format and idle period to send the coordination signaling may be changed in the original LAT scheme to support enhancements enabled by some embodiments disclosed herein.

Operations of a network node will now be discussed with reference to the flow chart of FIG. 14 and the modules of FIG. 15. For example, modules of FIG. 15 may be stored in access node memory 1305 of FIG. 13, and these modules may provide instructions so that when the instructions of a module are executed by processor 1303, processor 1303 performs respective operations of the flow chart of FIG. 14.

Figure 14:
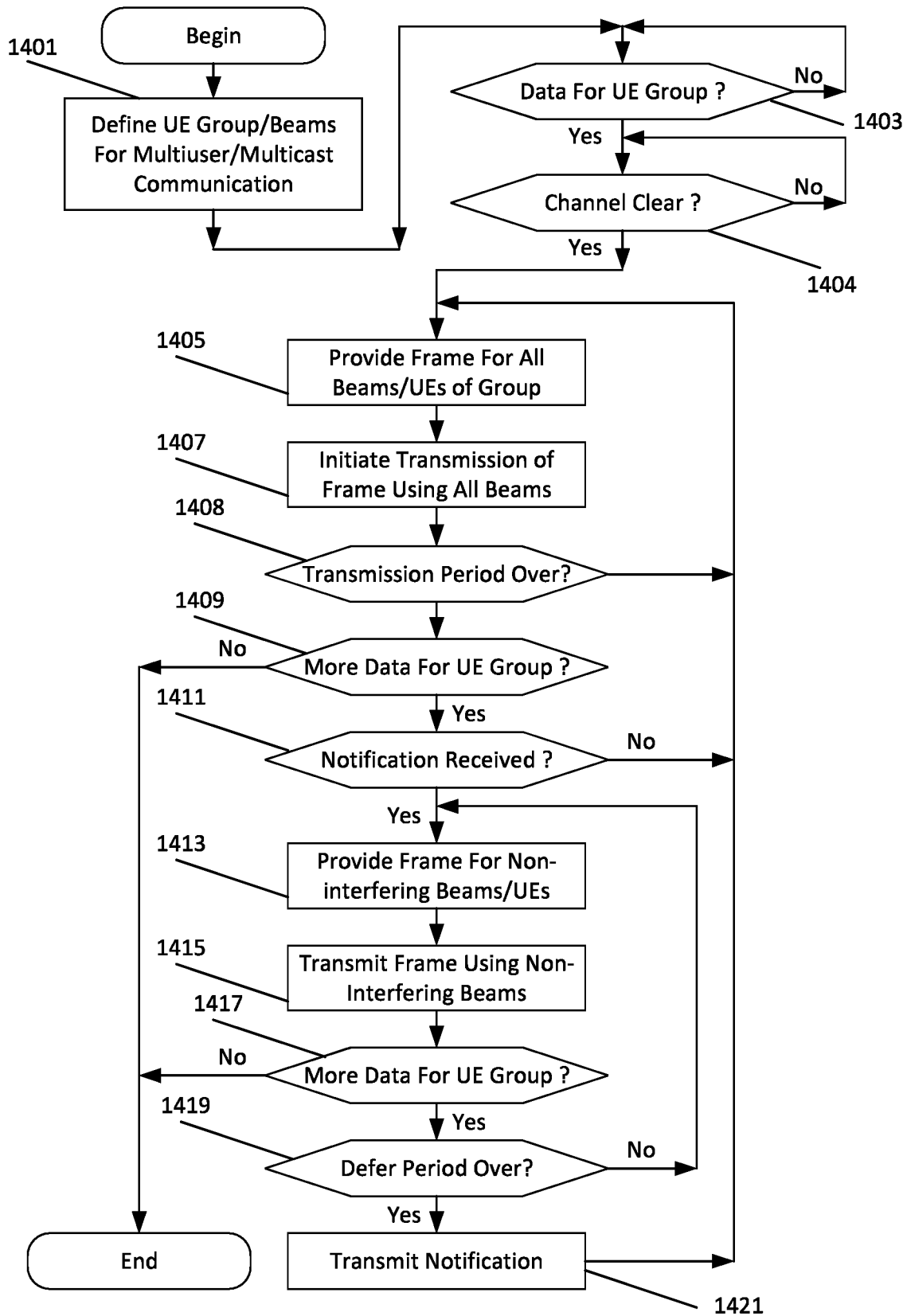
FIG. 14 is a flow chart illustrating access node operations according to some embodiments of inventive concepts.

At block 1401 of FIG. 14, processor 1303 may define a wireless terminal UE group and respective beams to be used for each wireless terminal UE of the group for multiuser/multicast communication (e.g., using Group/Beam definition module 1501). By way of example, the flow chart of FIG. 14 will be discussed with respect to a wireless terminal group including first, second, and third wireless terminals UE1, UE3, and UE5, with downlink beam 6 being used for transmission to wireless terminal UE1, with downlink beam 7 being used for transmission to wireless terminal UE5, and with downlink beam 8 being used for transmission to wireless terminal UE3. Moreover, wireless terminal UE2 will be discussed as an interfered wireless terminal that is subject to interference due to transmission to one of wireless terminals UE1, UE3, and/or UE5. While a group of three wireless terminals is discussed by way of example, a group of wireless terminals may include two or more wireless terminals for multiuser and/or multicast transmissions.

Responsive to reception of data for the UE group at block 1403 (e.g., through network interface 1307) at block 1403, processor 1303 may begin preparation of a frame for transmission to wireless terminals UE1, UE3, and UE5 of the group. Additionally/optionally, processor 1303 may perform a clear channel assessment (i.e., a Listen-Before-Talk evaluation) at block 1404 to determine if a frequency(ies) to be used to transmit the frame is available. Responsive to receipt of data for the group at block 1403 and determining that the channel is clear at block 1404, processor 1303 may proceed with an initial transmission.

At block, 1405 processor 1303 may provide a frame for all beams/UEs of the group based on the received data (e.g., using first frame providing module 1503). For example, providing the frame may include processor 1303 generating the frame based on received data and/or receiving the frame from another node of the network. The frame of block 1405 may include a header and a data block with data for wireless terminals UE1, UE3, and UE5. The header of block 1405 may include a first control field indicating a first idle period resource, a second control field indicating a second idle period resource, and a third control field indicating a third idle period resource, with the first, second, and third idle period resources being different. As shown in FIG. 3, the first, second, and third idle period resources may be orthogonal with respect to frequencies (e.g., subcarrier groups) used. As discussed in greater detail below, the data block of the frame may include different data for each of wireless terminals UE1, UE3, and UE5 for multiuser transmission, or the data block of the frame may include the some data for each of wireless terminals UE1, UE3, and UE5 for multicast transmissions.

According to some embodiments, a frame may thus include a header and a data block as shown in FIG. 3. The header and the data block of a frame may occupy a plurality of contiguous subcarrier groups in the frequency domain (e.g., 4 subcarrier groups in the example of FIG. 3) and a plurality of symbols in the time domain. The header of a frame, for example, may occupy 2 symbols in the time domain, and the data block of the frame may occupy 14 symbols following the header in the time domain.

At block 1407, processor 1303 may initiate transmission of the frame (through transceiver 1301) to wireless terminals UE1, UE3, and UE5 (e.g., using first frame transmission module 1505).

According to some embodiments, a first beam (e.g., beam 6 of FIG. 5) may be used for wireless terminal UE1, a second beam (e.g., beam 8 of FIG. 5) may be used for wireless terminal UE3, and a third beam (e.g., beam 8 of FIG. 5) may be used for wireless terminal UE5. Accordingly, the first control field and the data for wireless terminal UE1 may be transmitted using the first beam (e.g., beam 6), the second control field and the data for wireless terminal UE3 may be transmitted using the second beam (e.g., beam 8), and the third control field and the data for wireless terminal UE5 may be transmitted using the third beam (e.g., beam 7). Accordingly, the first idle period resource may correspond to wireless terminal UE1 and/or the first beam, the second idle period resource may correspond to wireless terminal UE3 and/or the second beam, and the third idle period resource may correspond to wireless terminal UE5 and/or the third beam, so that a different idle period resource is defined for each wireless terminal and/or beam of the multiuser/multicast transmission.

According to some other embodiments, orthogonal resources may be used for transmission of control field of the header and for transmission of data for the wireless terminals UE1, UE3, and UE5 as shown in the frame of FIG. 3 without using different beams.

Operations of blocks 1405 and 1407 may be repeated at block 1408 with transmission to all wireless terminals of the group over an initial transmission period. Stated in other words, a plurality of multiuser/multicast frames may be transmitted to the group including wireless terminals UE1, UE3, and UE5 before an idle period resource is provided to listen for any interference notification messages (e.g., NTS messages). In the LAT example of FIG. 1, three frames are transmitted before an idle period resource is provided. Accordingly, each of the plurality of frames includes a header as discussed above with respect to block 1405 identifying the respective idle period resources.

The first, second, and third control fields of the header may also indicate respective first, second, and third ACK/NACK feedback resources corresponding to the first, second, and third wireless terminals and/or beams. Accordingly, a different ACK/NACK feedback resource may be provided for each wireless terminal to allow separate ACK/NACK feedback from each wireless terminal of the group. The ACK/NACK feedback resources may be provided for each wireless terminal of the group, for example, using different time, frequency, code, and/or spatial resources. The first ACK/NACK feedback resource may thus be orthogonal with respect to the second and third feedback resources in at least one of time, frequency, beam, and/or code, the second ACK/NACK feedback resource may be orthogonal with respect to the first and third ACK/NACK feedback resources in at least one of time, frequency, beam, and/or code, and the third ACK/NACK feedback resource may be orthogonal with respect to the first and second ACK/NACK feedback resources in at least one of time, frequency, beam, and/or code.

For multiuser transmissions (where different data is transmitted to each wireless terminal of the group), processor 1303 may receive (through transceiver 1301) respective ACK/NACK feedback from each wireless terminal of the group after each downlink frame transmission, and a next frame may thus be provided at block 1405 (or 1413) based on the ACK/NACK feedback corresponding to the preceding frame. For an ACK, processor 1303 may provide new data for the respective wireless terminal in the next frame, and for a NACK, processor 1303 may provide the previous data for the respective wireless terminal in the next frame.

For multicast transmissions (where the same data is transmitted to all wireless terminals of the group), processor 1303 may receive respective ACK/NACK feedback from each wireless terminal of the group after each downlink frame transmission. With a multicast transmission, however, a single NACK from one wireless terminal of the group (while other wireless terminals respond with ACK) may result in retransmission of the previous data to all wireless terminals of the group in the next frame. According to some other embodiments, retransmission may only be provided in the next frame for the wireless terminal(s) and beam(s) corresponding to the NACK(s) to reduce power consumption and/or interference.

A plurality of downlink frames may thus be transmitted to all wireless terminals of the group at blocks 1405, 1407, and 1408 before a first idle period to listen for interference notification messages (e.g., NTS messages) from other wireless terminals that may have been subject to interference. Once the transmission period is complete at block 1408, processor 1303 may listen for interference notification messages send by other wireless terminals using the idle period resources indicated in the respective control fields of the header(s) of the frame(s) transmitted during the transmission period. Because each idle period resource is associated with a respective beam of the group transmission, an interfered wireless terminal UE2 may transmit its interference notification message (e.g., NTS message) on the idle period resource corresponding to the beam that caused interference, thereby allowing processor 1303 to efficiently identify the problematic beam based on the idle period resource over which the notification is received. According to some embodiments, each control field may also include a respective beam identification for the corresponding beam, and the respective beam identification may be included in an interference notification message transmitted from an interfered wireless terminal.

Provided that there is more data for transmission to the wireless terminal group at block 1409, processor 1303 may listen for interference notification messages (e.g., NTS messages), and if no such messages are received at block 1411, processor 1303 may continue with operations of blocks 1405, 1407, and 1408 for a next transmission period transmitting to all wireless terminals of the group.

Responsive to receiving an interference notification message (e.g., NTS message) from wireless terminal UE2 using the first idle period resource corresponding to wireless terminal UE1 and/or beam 6 at block 1411 (e.g., using notification reception module 1507), processor 1303 may provide (1413) a frame including a header and a data block with second data for wireless terminals UE3 and UE5 at block 1413 (e.g., using second frame providing module 1509). The header may include respective control fields for wireless terminal UE3 and for wireless terminal UE5, and each control field may indicate a respective idle period resource as discussed above with respect to block 1405. A control field and idle period resource, however, may be omitted for wireless terminal UE1 and beam 6.

At block 1415, processor 1303 may initiate transmission of the second frame (through transceiver 1301) to wireless terminals UE3 and UE5 while deferring transmission to wireless terminal UE1. Operations of blocks 1413 and 1415 may be repeated during a defer period at block 1419 as long as data is available for transmission to the group at block 1417. As discussed above with respect to block 1405, processor 1303 may provide frames at block 1413 based on ACK/NACK feedback received from wireless terminals UE3 and UE5. Responsive to an ACK, new data may be transmitted to the respective wireless terminal, and responsive to a NACK previous data may be retransmitted.

According to some embodiments, the second beam (e.g., beam 8 of FIG. 5) may be used for wireless terminal UE3, and the third beam (e.g., beam 8 of FIG. 5) may be used for wireless terminal UE5. Accordingly, the control field and the data for wireless terminal UE3 may be transmitted using the second beam (e.g., beam 8), and the control field and the data for wireless terminal UE5 may be transmitted using the third beam (e.g., beam 7). Accordingly, the second idle period resource may correspond to wireless terminal UE3 and/or the second beam, and the third idle period resource may correspond to wireless terminal UE5 and/or the third beam, so that a different idle period resource is defined for each wireless terminal and/or beam of the multiuser/multicast transmission.

According to some other embodiments, orthogonal resources may be used for transmission of control fields of the header and for transmission of data for the wireless terminals UE3 and UE5 at block 1415 as shown in the frame of FIG. 3 without using different beams.

Operations of blocks 1413 and 1415 may thus be repeated for a plurality of frames transmitted to wireless terminals UE3 and UE5 (while deferring transmissions to wireless terminal UE1) until a defer period is complete. A duration of the defer period may be defined, for example, based on system configuration, based on system information transmitted from the access node to the wireless terminals, and/or based on information provided by interfered wireless terminal UE2 in the interference notification message (e.g., NTS message).

Once the defer period is over at block 1419, processor 1313 may transmit a notification (e.g., an NTS message) at block 1421 (e.g., using notification transmission module) to inform the interfered wireless terminal UE2 that access node transmissions on the interfering beam will resume. Processor 1313 may then return to operation 1405 to resume group transmission to all wireless terminals UE1, UE3, and UE5 of the multiuser/multicast group.

According to some embodiments, operations of FIG. 14 may thus support multiuser group transmissions where a downlink frame includes different data for different wireless terminals of the group. A frame of block 1405 may thus include data for wireless terminal UE1 (to be transmitted over beam 6), data for wireless terminal UE3 (to be transmitted over beam 8), and data for wireless terminal UE5 (to be transmitted over beam 7), such that the data for each wireless terminal is different. Such different data may be transmitted using different/orthogonal time/frequency resources of the frame, or the different data may be transmitted using the same time/frequency resources of the frame (relying on spatial separation of the different beams). If different time/frequency resources are used (as shown in FIG. 3): data for wireless terminal UE1 may be transmitted using beam 6 and using a first time/frequency data resource of the data block; data for the wireless terminal UE3 may be transmitted using beam 8 and using a second time/frequency data resource of the data block; and data for wireless terminal UE5 may be transmitted using beam 7 and using a third time/frequency data resource of the data block. More particularly, each of the data resources may be orthogonal with respect to each of the other data resources of the data block in at least one of time and/or frequency.

If the same time/frequency is used for a multiuser transmission (as shown in FIG. 4), the use of different beams may be sufficient for wireless terminals UE1, UE3, and UE5 to receive the respective transmissions using the same frame. In such a transmission, padding may be provided for at least one of data for wireless terminal UE1, wireless terminal UE3, and/or wireless terminal UE5 so that the data for each of wireless terminals UE1, UE3, and UE5 occupies a same time and frequency resource during transmission as discussed with respect to FIG. 6.

According to some other embodiments, operations of FIG. 14 may support multicast group transmissions where the same data is transmitted to all wireless terminals (e.g., UE1, UE3, and UE5) of the group. Such transmissions are discussed with respect to FIGS. 7 and 8.

Figure 15:
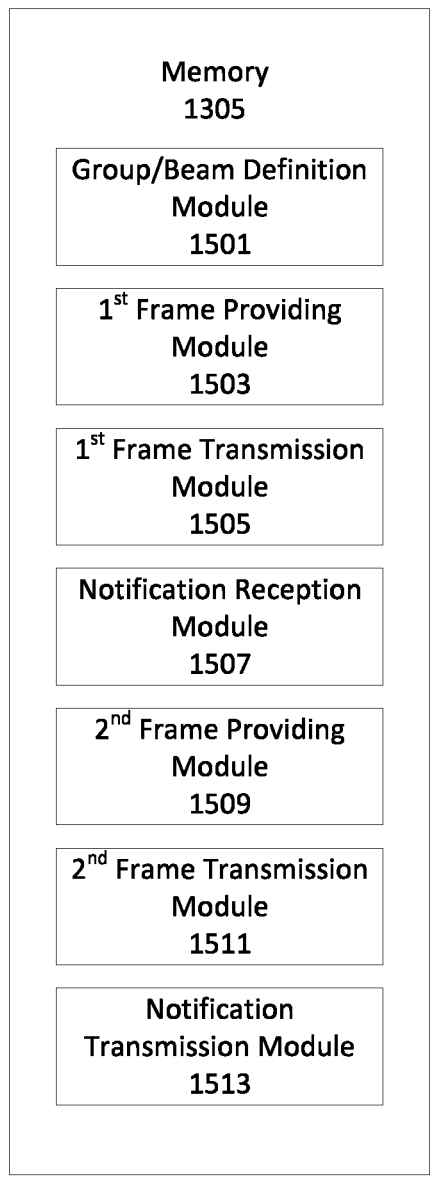
FIG. 15 is a block diagram illustrating access node memory with modules corresponding to operations of FIG. 14.

Various operations of FIG. 14 and/or modules of FIG. 15 may be optional with respect to some embodiments of network nodes and related methods. For example, operations of blocks 1401, 1403, 1404, 1408, 1409, 1411, 1417, 1419, and 1421 of FIG. 14 may be optional, and regarding related access nodes, modules 1501, 1507, and 1513 of FIG. 15 may be optional.

Operations of a wireless terminal will now be discussed with reference to the flow chart of FIG. 16 and the modules of FIG. 17. For example, modules of FIG. 17 may be stored in wireless terminal memory 1205 of FIG. 12, and these modules may provide instructions so that when the instructions of a module are executed by processor 1203, processor 1203 performs respective operations of the flow chart of FIG. 16.

At block 1601, wireless terminal processor 1203 may detect interference (e.g., using interference detection module). For example, processor 1203 may detect interference based on failure decoding a downlink communication from a serving access node using a frequency resource. Responsive to failing to decode the downlink communication at block 1601, processor 1203 may listen for interfering frames using the frequency resource (e.g., using listening module 1701). Responsive to an interfering frame at block 1605 (e.g., using interference receiving module 1705), processor 1203 may receive first and second control fields of a header of an interfering frame at block 1607 (e.g., using control field reception module 1707) with the first control field indicating a first idle period resource and the second control field indicating a second idle period resource different than the first idle period resource. Based on the interference from the interfering access node, processor 1203 may select (1609) the first idle period resource at block 1609 (e.g., using selection module 1709). Responsive to selecting the first idle period resource, processor 1203 may transmitting a notification message (NTS) to the interfering access node using the first idle period resource at block 1611 (e.g., using notification transmission module 1711). After transmitting the notification message, processor 1203 may receive (1613) a plurality of data frames from the serving access node at block 1613 (e.g., using data frame reception module 1713).

After receiving the plurality of data frames from the serving access node, processor 1213 may receive a notification message from the interfering access node at block

1615 (e.g., using notification reception module 1715). Responsive to receiving the notification message, processor 1203 may transmit a notify-not-to-send message to the serving access node at block 1617 (e.g., using NNTS transmission module 1717).

According to some embodiments, the control fields of block 1607 may include respective beam identifications, and the notification message of block 1611 may include the beam identification for the selected idle period resource.

Various operations of FIG. 16 and/or modules of FIG. 17 may be optional with respect to some embodiments of wireless terminals and related methods. For example, operations of blocks 1601, 1603, 1605, 1615, and 1617 of FIG. 16 may be optional, and regarding related wireless terminals, modules 1701, 1703, 1705, 1715, and 1717 of FIG. 17 may be optional.

ABBREVIATIONS

| Abbreviation | Explanation |
| --- | --- |
| ACK | Acknowledgement |
| AN | Access Network |
| AP | Access Point |
| ARQ | Automated Repeat request |
| BO | Backoff |
| BS | Base station |
| CCA | Clear Channel Assessment |
| CFP | Contention Free Period |
| CW | Contention Window |
| DCF | Distributed Coordination Function |
| DIFS | DCF Inter-frame Spacing |
| DL | Downlink |
| DN | Destination node |
| DRS | Discovery Reference Signal |
| eNB | evolved NodeB, base station |
| LAT | Listen After Talk |
| LBT | Listen Before Talk |
| MCS | Modulation Coding Scheme |
| MU-MIMO | Multi user multiple input multiple output |
| NR | New Radio (refers to the 5G radio interface) |
| NNTS | Notify not to send |
| NTS | Notify to send |
| QoS | Quality of Service |
| RB | Resource Block |
| RF | Radio Frequency |
| SCell | Secondary Cell |
| SIFS | Short Inter-frame Spacing |
| SN | Source node |
| STA | Station |
| UE | User Equipment |
| UL | Uplink |

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating an access node of a wireless communication network, the method comprising:
   providing a first frame including a first header and a first data block with first data for a first wireless terminal and a second wireless terminal, wherein the header includes a first control field indicating a first idle period resource and a second control field indicating a second idle period resource, wherein the first and second idle period resources are different;
   initiating transmission of the first frame to the first and second wireless terminals;
   responsive to receiving a notification message using the first idle period resource, providing a second frame including a second header and a second data block with second data for the second wireless terminal; and
   initiating transmission of the second frame to the second wireless terminal while deferring transmission to the first wireless terminal.

2. The method of claim 1,
   wherein initiating transmission of the first frame comprises using a first beam for the first wireless terminal and a second beam for the second wireless terminal, wherein the first control field is transmitted to the first wireless terminal using the first beam and the second control field is transmitted to the second wireless terminal using the second beam, wherein the first idle period resource corresponds to the first beam, and wherein the second idle period resource corresponds to the second beam, and
   wherein initiating transmission of the second frame comprises using the second beam for the second wireless terminal while deferring transmission using the first beam.

3. The method of claim 1,
   wherein the first data is for the first wireless terminal, the second wireless terminal, and a third wireless terminal,
   wherein the header includes a third control field indicating a third idle period resource,
   wherein initiating transmission of the first frame comprises initiating transmission of the first frame to the first, second, and third wireless terminals, and
   wherein the second data is for the second and third wireless terminals.

4. The method of claim 3,
   wherein initiating transmission of the first frame comprises using a first beam for the first wireless terminal, using a second beam for the second wireless terminal, and using a third beam for the third wireless terminal,
   wherein the first control field is transmitted to the first wireless terminal using the first beam, the second control field is transmitted to the second wireless terminal using the second beam, and the third control field is transmitted to the third wireless terminal using the third beam,
   wherein the first idle period resource corresponds to the first beam, the second idle period resource corresponds to the second beam, and the third idle period resource corresponds to the third beam, and
   wherein initiating transmission of the second frame comprises initiating transmission of the second frame to the second and third wireless terminals using the second beam for the second wireless terminal and using the third beam for the third wireless terminal while deferring transmission using the first beam.

5. The method of claim 4, wherein the first, second, and third beams define respective first, second, and third beamforming directions, wherein the first and second beamforming directions are different, wherein the first and third beamforming directions are different, and wherein the second and third beamforming directions are different.

6. The method of claim 5,
   wherein the first data includes first data for the first wireless terminal and first data for the second wireless terminal, wherein the first data for the first wireless terminal is different than the first data for the second wireless terminal.

7. The method of claim 6, wherein initiating transmission of the first frame comprises initiating transmission of the first data for the first wireless terminal using a first data resource of the first data block and initiating transmission of the first data for the second wireless terminal using a second data resource of the first data block, and wherein the first and second data resources are different.

8. The method of claim 7, wherein the first data resource of the first data block is orthogonal with respect to the second data resource of the first data block in at least one of time and/or frequency, and wherein deferring transmission to the first wireless terminal comprises deferring transmission using the first data resource.

9. The method of claim 6, wherein initiating transmission of the first frame comprises initiating transmission of the first data for the first wireless terminal and the first data for the second wireless terminal using a same time and frequency resource.

10. The method of claim 9, wherein providing the first frame comprises providing padding for at least one of the first data for the first wireless terminal and the second data for the second wireless terminal to provide that the first data for the first wireless terminal and the second data for the second wireless terminal occupy a same time and frequency resource during transmission.

11. The method of claim 3, wherein the first control field indicates a first feedback resource corresponding to the first wireless terminal, wherein the second control field indicates a second feedback resource corresponding to the second wireless terminal, wherein the third control field indicates a third feedback resource corresponding to the third wireless terminal, and wherein the first, second, and third feedback resources are different.

12. The method of claim 11, wherein the second data block includes new data for the second wireless terminal responsive to receiving an acknowledgment from the second wireless terminal using the second feedback resource, and wherein the second data block includes previously transmitted data of the first frame for the third wireless terminal responsive to receiving a negative acknowledgement from the third wireless terminal using the third feedback resource.

13. The method of claim 11, wherein the first feedback resource is orthogonal with respect to the second and third feedback resources in at least one of time and/or frequency, wherein the second feedback resource is orthogonal with respect to the first and third feedback resources in at least one of time and/or frequency, and wherein the third feedback resource is orthogonal with respect to the first and second feedback resources in at least one of time and/or frequency.

14. The method of claim 11, wherein the first, second, and third feedback resources are defined using respective different beams and/or codes.

15. The method of claim 3,
wherein the first data includes first data for the first wireless terminal and first data for the second wireless terminal, wherein the first data for the first wireless terminal is different than the first data for the second wireless terminal, and
wherein initiating transmission of the first frame comprises initiating transmission of the first data for the first wireless terminal using the first beam and initiating transmission of the first data for the second wireless terminal using the second beam.

16. The method of claim 1, wherein initiating transmission of the first frame comprises initiating transmission of the same first data to the first and second wireless terminals.

17. The method of claim 1, wherein the notification message comprises a notify-to-send message received from an interfered wireless terminal.

18. The method of claim 1, wherein the first control field includes a first beam identification for the first beam, wherein the second control field includes a second beam identification for the second beam, and wherein the notification message includes the first beam identification.

19. The method of claim 1, further comprising:
before initiating transmission of the first frame, performing a clear channel assessment of a frequency to be used to transmit the first frame; and
wherein initiating transmission of the first frame comprises initiating transmission of the first frame responsive to a determination that the frequency is clear of interfering transmissions.

20. An access node comprising:
a transceiver configured to provide wireless communications in a wireless communication network; and
a processor coupled with the transceiver, wherein the processor is configured to provide wireless communication through the transceiver, and wherein the processor is configured to,
provide a first frame including a first header and a first data block with first data for first wireless terminal and second wireless terminal, wherein the header includes a first control field indicating a first idle period resource and a second control field indicating a second idle period resource, wherein the first and second idle period resources are different;
initiate transmission of the first frame to the first and second wireless terminals;
provide a second frame including a second header and a second data block with second data for the second wireless terminal responsive to receiving a notification message using the first idle period resource; and
initiate transmission of the second frame to the second wireless terminal while deferring transmission to the second first wireless terminal.

21. A method of operating a wireless terminal in a wireless communication network, the method comprising:
responsive to interference from an interfering access node, receiving first and second control fields of a header of an interfering frame wherein the first control field indicates a first idle period resource and the second control field indicates a second idle period resource, wherein the first and second idle period resources are different;
based on the interference from the interfering access node, selecting the first idle period resource;
responsive to selecting the first idle period resource, transmitting a notification message to the interfering access node using the first idle period resource; and
after transmitting the notification message, receiving a plurality of data frames from a serving access node.

22. The method of claim 21, further comprising:
after receiving the plurality of data frames from the serving access node, receiving a notification message from the interfering access node; and
responsive to receiving the notification message, transmitting a notify-not-to-send message to the serving access node.

23. The method of claim 21, wherein the first control field includes a first beam identification, wherein the second control field includes a second beam identification, and wherein the notification message includes the first beam identification.

24. The method of claim 21, further comprising:
before receiving the first and second control fields, failing to decode a downlink communication from the serving access node using a frequency resource;
responsive to failing to decode the downlink communication, listening for interfering frames using the frequency resource; and
wherein receiving the first and second control fields comprises receiving the first and second control fields responsive to listening for interfering frames.

25. A wireless terminal comprising:
a transceiver configured to provide wireless communications in a wireless communication network; and a processor coupled with the transceiver, wherein the processor is configured to provide wireless communication through the transceiver, and wherein the processor is configured to,
receive first and second control fields of a header of an interfering frame responsive to interference from an interfering access node, wherein the first control field indicates a first idle period resource and the second control field indicates a second idle period resource, wherein the first and second idle period resources are different;
select the first idle period resource based on the interference from the interfering access node;
transmit a notification message to the interfering access node using the first idle period resource responsive to selecting the first idle period resource; and
receive a plurality of data frames from a serving access node after transmitting the notification message.

\* \* \* \* \*